Oct. 9, 1928.

B. W. KADEL 1,686,618

CAR DOOR MECHANISM

Filed May 24, 1923

2 Sheets-Sheet 1

INVENTOR
BYERS W. KADEL
BY
HIS ATTORNEYS

Oct. 9, 1928.

B. W. KADEL 1,686,618

CAR DOOR MECHANISM

Filed May 24, 1923

2 Sheets-Sheet 2

INVENTOR
BYERS W. KADEL

Patented Oct. 9, 1928.

1,686,618

UNITED STATES PATENT OFFICE.

BYERS W. KADEL, OF BALTIMORE, MARYLAND.

CAR-DOOR MECHANISM.

Application filed May 24, 1923. Serial No. 641,064.

This invention relates to door mechanism for railway cars or the like and among its objects is to provide improved arrangements whereby the doors may be lifted to a partially closed position and thereafter forced to a completely closed position. The invention also includes means for supporting the doors in partially closed position and means for thereafter supporting them in fully closed position. Another object is to provide means attached to a car door whereby a removable door closing member may be temporarily applied to the door to lift the latter nearly shut and to provide for use therewith a ledge associated with the car body and the door in such a manner that the lifting member may be seated upon the ledge when the door is in partly closed position to thereby temporarily support the door in such position. A still further object is to so arrange the ledge that the door-closing member may be fulcrumed upon it and be employed as a lever or pry for forcing the door to fully closed position. With such general objects and other advantageous purposes in view, the invention consists of the construction, combination and arrangement of parts as will be herein described and particularly claimed.

Figure 1:
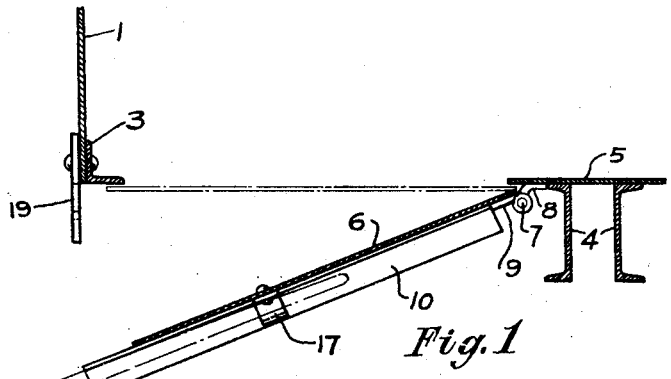
Figure 2:
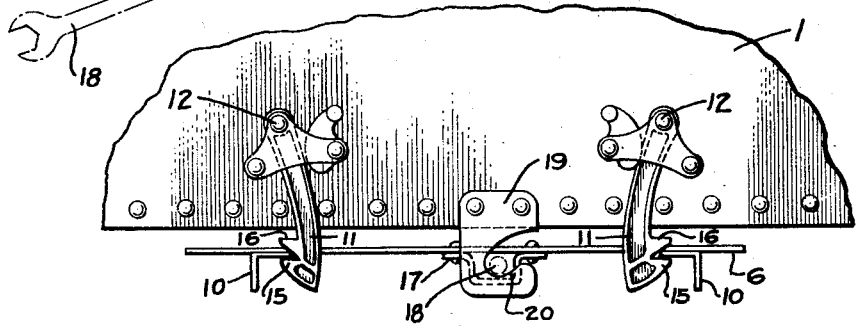
Figure 3:
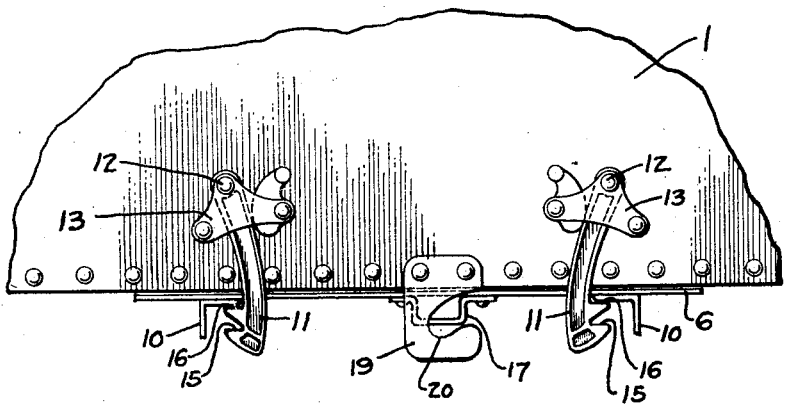
Figure 4:
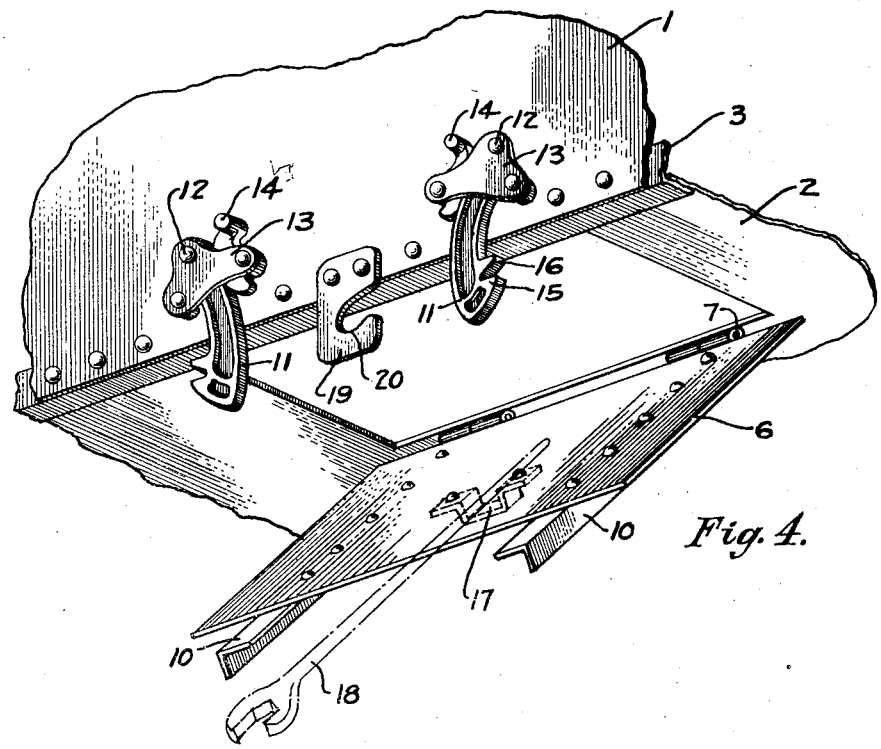
Figure 5:
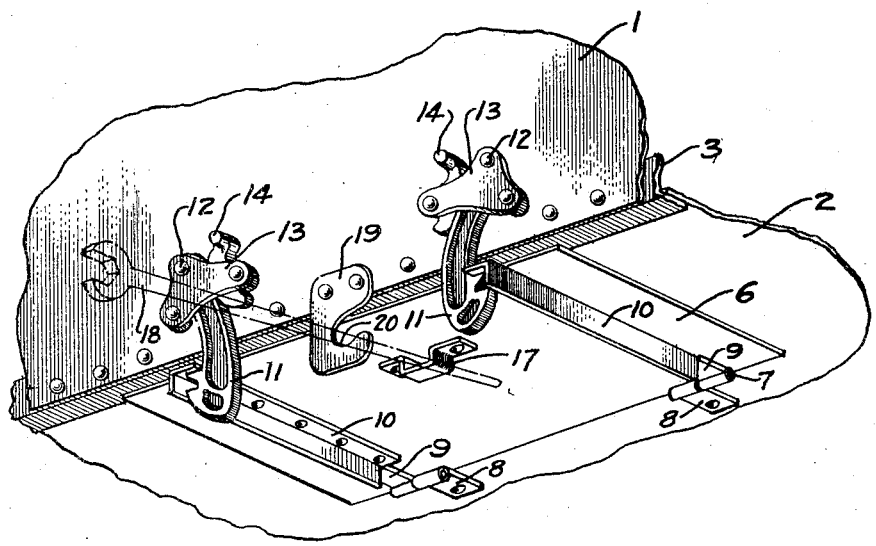

In the accompanying drawings, which show a preferred form of the invention, Figure 1, is a partial transverse sectional view of a car body having a door constructed in accordance with the principles of the present invention. In this view the door is shown in full lines as in nearly open position and in dotted outline in fully closed position. Figure 2 is a fragmentary side elevation view of the same. In this view the door is shown in partly closed position. Figure 3 is a view similar to Figure 2, but showing the door in fully closed position. Figure 4 is a perspective view of a portion of the side and bottom of the car. In this view the door is shown as open for the discharge of the lading. Figure 5 is a view similar to Figure 4, but showing the door in a completely closed position.

Referring to these drawings, the side of the car is denoted by the numeral 1, and the floor of the car by the numeral 2. The customary bottom flange angle 3 may be employed to secure the car side and the floor together. The car may be supplied with the ordinary center sill construction, including the longitudinally extending center sill channels 4 and cover plate 5. The floor of the car is shown as formed with an opening suitable for the discharge of the lading from the interior of the car and a drop door 6 is provided for normally closing this opening.

The door is shown as formed of a steel plate and is hinged at 7 along the center sill of the car. Body and door hinges 8 and 9 respectively are provided for this purpose, the hinge pintles being shown as extending longitudinally of the car and parallel with and along the upper edge of the center sill construction. The door, which is thus arranged to close with its free edge along the side of the car, may extend beneath the inturned leg of the bottom flange angle 3 when closed.

For stiffening and supporting the door a pair of angle irons 10 are employed. These extend outwardly beyond the free edge of the door and somewhat outside of the lines of the side 1 of the car, their outer end portions being arranged for engagement by suitable door supporting hooks 11, which are shown as pivoted to the outer face of the car side 1. Suitable pivot brackets 13 may be employed for the hooks 11, while pivoted hook-locking cams 14 also mounted on the brackets may be employed to hold the hooks in engagement with the extended ends of the angles or door arms 10. Each of the hooks 11 is shown as provided with a preliminary supporting ledge 15 and a final supporting ledge 16, whereby the door may be supported either in partly closed or in fully closed position, depending upon whether the horizontal legs or supporting seats of the angles 10 engage with the ledges 15 or the ledges 16 of the hooks. This construction is well-known in the art, although other forms might also be employed in connection with the present invention. And while the provision of members such as the hooks 11 carried by the car body whereby the door may be supported either in partly closed or in fully closed position is desirable, it is not necessary that such be employed as the invention in itself includes a means for the temporary support of the door in partly closed position.

It is the practice in manipulating car doors of the type shown and described to lift them to a partly closed position by hand and thereafter to force or pry them to a completely closed position. The present invention has to do with means for facilitating such manipulating of the doors. To this end a hasp 17 is secured to the under face of the door to constitute a socket for receiving a removable temporary lifting member or lever. An ordinary long handled wrench, such as is indicated at 18, forms an entirely satisfactory member of this character. When it is desired to close the door this bar member 18 is inserted in the socket, and as the socket 17 is located slightly back from the free edge of the door the latter may be lifted by the operator upon imparting upward movement to the outer end of the said member 18. Rigidly attached to the side of the car near the free edge of the door is a fulcrum bracket 19 which is made in the general form of a fixed hook having an open side. This is located approximately in line with the socket or hasp 17 transversely of the car so that when the door is lifted by means of the wrench or lever 18 the lever may be shifted or rotated laterally of the door in a plane approximately parallel with and beneath the plane of the door, thereby enabling the lever to pass within the opening of the fulcrum bracket 19 and may rest upon the ledge 20 thereof. The ledge 20 is so disposed that when the lever 18 is seated thereupon the door may be thereby held in nearly closed position. When used with the double ledge hooks 11 such as shown in the drawings the fulcrum bracket 19 should be so proportioned that the lever 18 may be shifted to position on the ledge 20 when the door angles 10 are in engagement with the ledges 15 of the hooks, although considerable latitude is permissible in this respect so long as the door is arranged to be lifted to a position where the lever 18 may be shifted to seat upon ledge 20.

With the lever in position on the ledge 20, downward pressure applied to the outer end of the lever will cause the door to be forced upward to a completely closed position where the hooks 11 or other supporting members may engage and sustian it. The lever 18 may, if desired, be slid outward beyond the position shown in Figure 1 to give greater leverage for effecting the final closing of the door. When the door is closed and latched the lever may be removed, as it ordinarily extends outward beyond the limits to which car equipment may be constructed.

I have thus described an embodiment of my invention. Other embodiments are contemplated within the scope of the appended claims without departing from the spirit thereof.

What is claimed is:

1. A railway car having a lading discharge opening, a door for closing said opening movable to open position under the influence of gravity, means secured to the door for accommodating a removable door-closing member so that by application of an upward force to the said removable member the door may be raised to a partially closed position, and a member on the car body for thereafter cooperating with the said removable member so that by application of a downwardly force to the latter the door may be raised from the partially closed position to fully closed position.

2. In a car door mechanism, a car door, means carried by the car body for supporting the door in partly closed or fully closed position, and means carried by the car body for cooperating with a removable door-closing member, said means being so arranged that by movement of the said door-closing member in one direction the door may be moved to a partly closed position for engagement with the said means for supporting the door, and that by movement of the said removable door-closing member thereafter in the opposite direction the door may be forced to a fully closed position for engagement with the said means for supporting the door.

3. In a car door mechanism, a door hinged to the car body, a ledge carried by the car body near an edge of the door, and means on the door adapted to cooperate with a removable door-lifting member, said ledge and said means being so formed and disposed that when the door has been lifted by the employment of a door-lifting member as aforesaid the latter may be caused to engage with said ledge to form a temporary support for the door and will also fulcrum upon said ledge to force said door to fully closed position.

4. In a car door mechanism, a door hinged to the car body, a ledge carried by the car body near an edge of the door, and means on the door adapted to form a socket for a removable door-lifting member, said ledge being so formed and disposed that when the door has been lifted by the employment of a door-lifting member as aforesaid, the said door-lifting member may be caused to engage with said ledge to form a temporary support for the door, the parts being also so formed and arranged that the said door-lifting member may then be employed as a lever of the first class, with the said ledge as a fulcrum, to force the door to a fully closed position.

5. In a car door mechanism, a door hinged to the car body, a lever-receiving socket affixed to the door, and an open sided fulcrum member carried by the car body near an edge of the door, said fulcrum being formed and arranged to receive and supportingly accommodate a door-closing lever after the same is inserted in the socket aforesaid and to constitute a fulcrum for said lever.

6. In a car door mechanism, a door hinged to the car body, a socket affixed to the door adapted to accommodate a removable door-closing member, and an open sided fulcrum affixed to the car body near an edge of the door and approximately in line with the socket, the said fulcrum being arranged to receive and support the said door-closing member upon transverse movement thereof and to form a fulcrum for said door-closing member enabling the latter to forcibly close the door.

7. In a door mechanism for railway cars, a door hinged to the car body, a lifting-lever socket affixed to the door, a lifting-lever fulcrum seat affixed to the car body, said socket and seat being adapted to accommodate a removable door-lifting lever engageable with said fulcrum upon rotative movement in a plane parallel with the plane of the door, and means upon the car body to engage and support the door when same is closed.

8. In a door mechanism for railway cars, a door hinged upon the car body, means pivoted to the car body adapted to support the door in partly closed or in fully closed position, a lifting-lever socket affixed in overlapping relation to the under surface of the door, and a lifting-lever fulcrum affixed to the car body, the said fulcrum being arranged to receive a door-lifting lever positioned in said socket without the removal of the same from the said socket.

9. In a door mechanism for railway cars, a door hinged to the car body, door supporting members affixed to the car body, a lifting-lever socket carried upon the lower surface of the door, and a hook-shaped fulcrum bracket affixed to the car body, the same being arranged for engagement with a door-lifting lever positioned in said socket upon a shifting of the said lever transversely of the door, and without the withdrawal thereof from the socket.

In testimony whereof I affix my signature.

BYERS W. KADEL.